(12) United States Patent
Matsen et al.

(10) Patent No.: US 6,566,635 B1
(45) Date of Patent: May 20, 2003

(54) SMART SUSCEPTOR HAVING A GEOMETRICALLY COMPLEX MOLDING SURFACE

(75) Inventors: Marc R. Matsen, Seattle, WA (US); Ronald W. Brown, Des Moines, WA (US); John R. Fischer, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/094,494

(22) Filed: Mar. 8, 2002

(51) Int. Cl.⁷ .................................................. H05B 6/12
(52) U.S. Cl. ...................................... 219/633; 219/634
(58) Field of Search ................................ 219/618, 602, 219/603, 633, 634, 635, 644, 645, 659

(56) References Cited

U.S. PATENT DOCUMENTS

| | | |
|---|---|---|
| 4,816,633 A | 3/1989 | Mucha et al. |
| 4,897,518 A | 1/1990 | Mucha et al. |
| RE33,644 E | 7/1991 | Hall |
| 5,645,744 A | 7/1997 | Matsen et al. |
| 5,728,309 A | 3/1998 | Matsen et al. |
| 5,760,379 A * | 6/1998 | Matsen et al. ............... 219/633 |
| 5,876,540 A * | 3/1999 | Pannell ......................... 156/91 |
| 6,046,442 A | 4/2000 | Kawamura et al. |

* cited by examiner

*Primary Examiner*—Tu Ba Hoang
(74) *Attorney, Agent, or Firm*—Alston & Bird LLP (57) ABSTRACT

An induction heating device for manufacturing a part by heating the part to a predetermined temperature. The induction heating device includes an induction coil connected to an electrical power supply for generating an electromagnetic flux field. A smart susceptor of the heating device is positioned in the electromagnetic flux field and includes a magnetically permeable material supported by a mesh structure. The magnetically permeable material generates heat in response to the flux field. The mesh structure provides support for the magnetically permeable material and closely conforms to the desired outer geometry of the part. The magnetically permeable material may be applied as a powder to the mesh using a hot spray gun, allowing tight conformance of the susceptor to the part geometry while avoiding forming limits of sheet metal susceptors.

27 Claims, 8 Drawing Sheets

SMART SUSCEPTOR HAVING A GEOMETRICALLY COMPLEX MOLDING SURFACE

FIELD OF THE INVENTION

The present invention relates to the use of induction heating systems, more particularly, to the use of smart susceptors to selectively heat a part or parts during a manufacturing process.

BACKGROUND OF THE INVENTION

Generally, induction heating processes may be carried out using any material that is electrically conductive and that generates heat when exposed to an electromagnetic flux field. Often, induction heating is used to directly heat an electrically conductive part during a manufacturing process. The electromagnetic flux field can be generated by an electromagnetic coil that surrounds the part and is supplied with alternating, or oscillating, electrical current from a power source. However, when a simple electromagnetic coil design and thorough heating of the part are desired, the induction heating process typically requires the use of a susceptor that encapsulates the part. Susceptors are not only electrically conductive, but also have a high thermal conductivity for a more efficient and thorough heating of the part. Therefore, manufacturing processes requiring localized heating, relatively quick heat-up and cool-down times, a more efficient use of power, or customized thermal properties that enable fabrication, benefit from induction heating processes that use susceptors.

Certain manufacturing processes require heating up to, but not beyond, a certain temperature. A select type of susceptor, often referred to as a "smart susceptor," is constructed of a material, or materials, that generate heat efficiently until reaching a threshold, or Curie, temperature. As portions of the smart susceptor reach the Curie temperature, the magnetic permeability of those portions drops precipitously. The drop in magnetic permeability has two effects, it limits the generation of heat by those portions at the Curie temperature, and it shifts the magnetic flux to the lower temperature portions causing those portions below the Curie temperature to more quickly heat up to the Curie temperature.

Mechanical part manufacturing processes often require the controlled application of heat, such as when consolidating composite panels, or for metal forming processes such as brazing and superplastic forming. To this end, smart susceptors have been employed in combination with dies for mechanical forming such as the invention described in U.S. Pat. No. 5,728,309 to Matsen et al. commonly assigned and incorporated herein by reference. Matsen discloses an induction heating workcell 10 that includes a pair of ceramic dies 20, 22 mounted within a pair of strongbacks 24, 26. A pair of cavities 42, 44 defined by the dies hold respective ones of a pair of tool inserts 46, 48. A retort 60 is positioned between the tool inserts and includes a pair of susceptor sheets sandwiching a pair of metal, or composite, part panels. The tool inserts define a contoured forming surface 58 that has a shape corresponding to the desired shape of the upper and lower mold line surfaces of the completed part. An induction coil 35 is embedded into the dies and surrounds the cavities, tool inserts and the retort.

Suction pressure can be used to hold the susceptor halves to the dies when handling the dies before the start of the process. During the process, the retort is heated to forming or consolidation temperature by energizing the induction coil which generates an electromagnetic flux field. The flux field causes the susceptor plates to generate heat, while the dies and tool inserts have a relatively low magnetic permeability and therefore generate little heat. Internal tooling pressure is used to hold the susceptors against the dies during processing. This pressure is either supplied by sealing around the perimeter of the dies or using pressurized bladders. The application of heat and pressure is continued until the metal part panels are properly brazed, or formed, or the resin in the composite panels is properly distributed to form the completed part.

Advantageously, the susceptor may be custom tailored to the desired operating temperature by using different alloy materials such as cobalt/iron, nickel/iron, iron/silicon, or amorphous or crystalline magnetic alloys. Also, the susceptor can be designed to have several different operating temperatures by using multiple layers of different alloys that are tuned to different Curie temperatures.

Generally, the formation of parts having geometrically complex outer surfaces requires an equally complex mold surface. In an alternative design, the smart, susceptor may be constructed of a pair of metal sheets that are cold or hot formed so as to define an inner mold surface that corresponds to the desired part surface. Each formed metal sheet is positioned in the cavity of a respective one of the dies so that the dies support the formed metal sheets. During processing, the susceptor sheets generate heat and a vacuum pressure is applied to conform the part panels to the inner mold surface defined by the formed metal sheets. Unfortunately, the metal sheets used for the susceptor have forming limits which in turn tend to limit the complexity of the mold surface that can be defined by the metal sheets of the susceptor.

Therefore, it would be advantageous to have an induction heating device for the formation of geometrically complex parts. More particularly, it would be advantageous to have a system for forming a susceptor mold surface having a complex geometry, thereby allowing the manufacture of geometrically complex parts.

SUMMARY OF THE INVENTION

The present invention addresses the above needs and achieves other advantages by providing an induction heating device for manufacturing a part, including a geometrically complex part, by heating the part to a predetermined temperature. The induction heating device includes an induction coil connected to an electrical power supply for generating an electromagnetic flux field. A smart susceptor of the heating device is positioned in the electromagnetic flux field and includes a magnetically permeable material supported by a mesh structure. The magnetically permeable material generates heat in response to the flux field. The mesh structure provides support for the magnetically permeable material and closely conforms to the desired outer geometry of the part. The magnetically permeable material may be applied as a powder to the mesh using a hot spray gun, allowing tight conformance of the susceptor to the part geometry while avoiding forming limits of sheet metal susceptors.

In a first embodiment, the induction heating device includes an electrical power supply, an induction coil and a smart susceptor. The induction coil is operably connected to the electrical power supply and is capable of generating an electromagnetic flux field from the electrical power. The smart susceptor is positioned in the electromagnetic flux field. The smart susceptor includes a magnetically permeable material responsive to the electromagnetic flux to generate heat. Further, the smart susceptor includes a mesh structure supporting the magnetically permeable material. The mesh structure and the magnetically permeable material conform to at least a portion of the part so as to be capable of receiving the portion of the part and heating the portion of the part as the magnetically permeable material is heated.

The mesh structure may be constructed of wire capable of withstanding the heat generated by the electromagnetic flux. For instance, the mesh structure may be constructed of 0.02 inch thick stainless steel wire. Optionally, the mesh structure may also be constructed of magnetically permeable wire, such as a smart susceptor alloys to improve inductive heat generation.

The magnetically permeable material and mesh structure may define a cavity that conforms to all of the part. The mesh structure includes a pair of separable portions that are combinable to define the cavity. Preferably, the induction heating device further includes a die having a pair of die portions wherein each of the separable portions of the mesh structure are attached to a respective one of the die portions. In this manner, the die is configured to hold the separable portions of the mesh structure together so as to define the cavity.

In another embodiment, the present invention includes a method of manufacturing a smart susceptor for heating a part in response to the application of a magnetic flux field. The method of manufacturing includes providing a model having an outer geometry similar to that of the part. In one aspect, the model can be machined from richlite or aluminum. A mesh screen is draped over the part and conformed to the outer geometry of the model such as by tacking or gluing the mesh screen to the outer geometry of the model. Magnetically permeable material is deposited on the mesh screen and the mesh screen, with the permeable material, is released from the model.

The magnetically permeable material may be developed by thermally spraying a magnetically permeable powder onto the mesh screen. The screen and powder are bright annealed and sintered to consolidate the combination. Optionally, such bright annealing may occur in a hydrogen gas furnace. As another option, the consolidated powder and screen may be thermally sprayed on both sides with a nickel aluminide coating to protect against oxidation.

The present invention has several advantages. The use of the mesh screen and thermally sprayed, magnetically permeable powder allows the smart susceptor to be molded to geometrically complex parts, overcoming the forming limitations of previously used metal sheets. In particular, the flexible weaves of mesh closely drape to the geometrically complex parts while providing support for the magnetically permeable material to avoid failure during handling and processing. Increased complexity of part geometry allows a reduction in the number of parts used in assemblies, with a concomitant cost and weight reduction. Hydrogen gas furnace annealing reduces oxidation in the mesh and sprayed powder material, while the increased temperature increases the density of the material.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
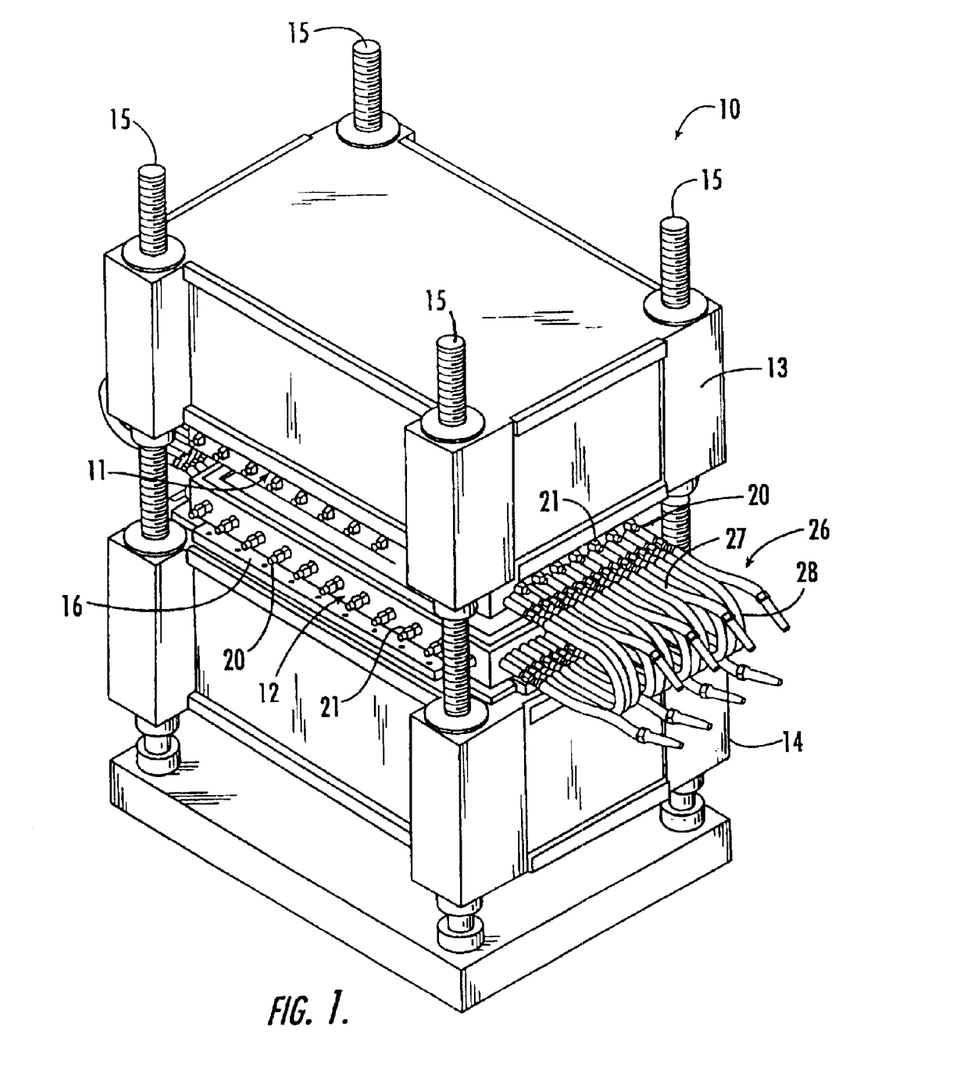
FIG. 1 shows a perspective view of an induction heating workcell of one embodiment of the present invention.
Figure 2:
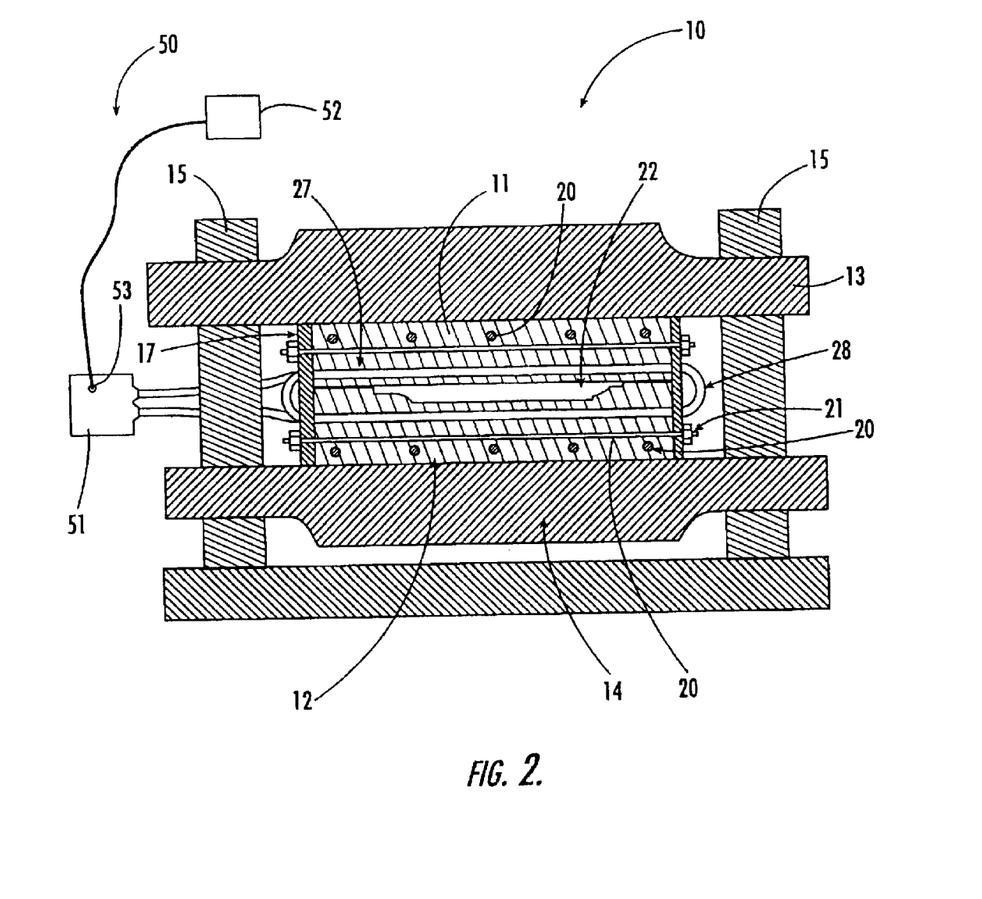
FIG. 2 is a schematic diagram of the workcell shown in FIG. 1 including a temperature control system of another embodiment of the present invention.
Figure 3:
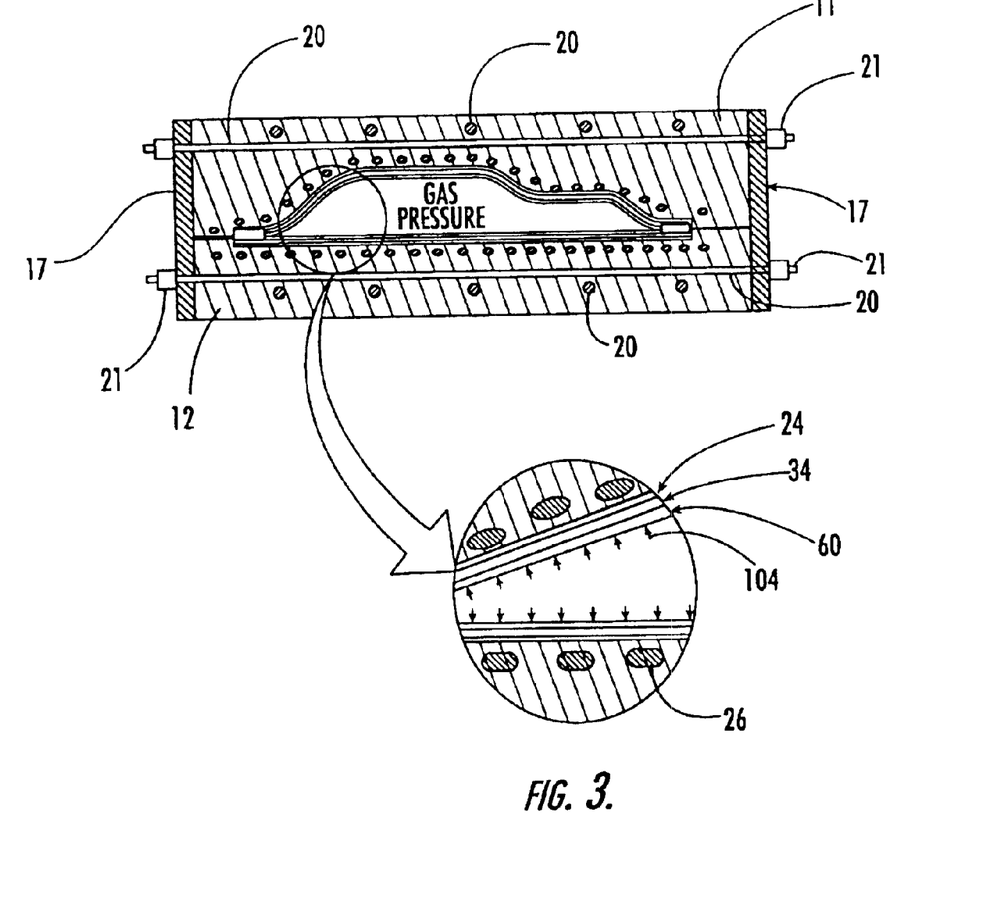
FIG. 3 is a schematic of a pair of dies of the workcell shown in FIG. 1, wherein the pair of dies define a cavity which contains a thermally sprayed susceptor forming a metal part.

In one embodiment, the present invention includes an induction heating workcell 10, as shown in FIG. 1. The workcell includes an upper die 11 mounted within an upper strongback 13 and a lower die 12 mounted within lower strongback 14. The strongbacks are each threaded onto four threaded column supports, or jackscrews 15 allowing adjustment of the relative positions of the dies and strongbacks. Together, the dies 11, 12 define a die cavity 22 that is shaped to hold a smart susceptor 34 that, in turn, surrounds a part, including a geometrically complex part 60, such as a titanium part for an aircraft, as shown in FIGS. 2 and 3. A plurality of induction coils 26 are embedded in the die and surround the susceptor 34. When energized, the coils 26 create a magnetic flux field that causes the susceptor 34 to generate heat so as to perform a step in manufacturing the part 60, such as forming a metal part, or consolidating a composite part.

The induction heating workcell 10 further includes a set of clamping bars 16 that hold the dies in place against the strongbacks 13, 14. The strongbacks provide a rigid, flat backing surface for the upper and lower dies 11, 12 which prevents the dies from bending and cracking during the manufacturing operation. Additionally, the strongbacks serve as stiff plates that keep the dies together and accurately positioned. The strongbacks may be constructed of steel, aluminum, or any other material capable of handling the loads present during forming or consolidation. Preferably, nonmagnetic materials are used to prevent distortion of the magnetic fields produced by the induction coil 26. As an alternative to the use of strongbacks, the dies 11, 12 themselves may be strong enough to withstand the loads present during forming or consolidation. In the embodiment depicted in FIGS. 1 and 2, the strongbacks have a rectangular box shape, but may be varied in shape and size to accommodate a myriad of desired die sizes and shapes.

Each of the dies 11, 12 includes a rectangular block of ceramic material 23 reinforced by a set of fiberglass rods 20 and a set of support plates 17. The support plates are preferably a set of phenolic boards arranged in the shape of a rectangular box framing each ceramic block 23. The phenolic boards 17 serve as containment walls during casting of the ceramic blocks 23 and also provide reinforcement during the subsequent induction heating process. As shown in FIG. 1, the fiberglass rods extend longitudinally in a first array, and transversely in a second array, so as to form a grid through each ceramic material block 23. The ends of the fiberglass rods are threaded and extend through respective, opposing ones of the phenolic boards 17. The grid is embedded into the ceramic block 23 by extending the fiberglass rods 20 through the phenolic boards 17 before casting the ceramic material block 23.

After the block of ceramic material is cast, a set of nuts 21 are placed on the threaded ends of the fiberglass rods and are tightened so as apply a compressive load on the phenolic boards 17. The compressive load on the boards results in a pre-stressed, compressive load on the ceramic material block 23. The pre-stressed compressive load cancels the tensile loads developed during the induction heating process. Maintaining the ceramic block in compression is advantageous due to the poor tensile properties of ceramic materials. Other materials may be used to construct the material block 23, but ceramic (specifically Ceradyne 120) is preferred because it is a thermal insulator and has a low coefficient of thermal expansion. The low coefficient of thermal expansion allows the block to be subjected to steep thermal gradients without spalling of the material. In addition, the ceramic serves to insulate the die cavity 22 against heat loss, conserving the heat generated by the susceptor 34 and shortening the cycling times for heating and cooling the part 60. Further, such characteristics provide additional flexibility in the design of thermal cycles for various types of parts, resulting in an overall performance improvement.

The induction coils 26 are also embedded into the ceramic material blocks 23 during casting and are positioned between the fiberglass rods 20 and surround the die cavity 22, as shown in FIGS. 1–3. Preferably, the coils 26 are fabricated from 1 inch diameter, 0.0625 inch wall thickness, round copper tubing which is lightly drawn. The preferred lightly drawn condition of the tubing enables precision bending by numerical bending machines, as is known to those of skill in the art. Numerical bending of the tubes allows accurate placement of the tubing around the cavity 22, which is important due to the need to evenly distribute the electromagnetic flux. The coils 26 also remove thermal energy by serving as a conduit for a coolant fluid, such as water. After being bent and embedded, the coils 26 include straight tubing sections 27 connected by flexible tubing sections 28. The flexible tubing sections connect the straight tubing sections 27 and also allow the dies 11, 12 to be separated. Preferably, the thickness of the cast ceramic between the susceptor 34 and the coils 26 is about ¾ of an inch, which is sufficient to support the temperature gradient between the heated susceptor and the water-cooled coils. FIG. 3 illustrates the close positioning of the coils along the contours of the die cavity 22, and the susceptor 34 contained therein. The accurate placement of the tubing of the coils 26 around the cavity promotes uniformity in the amount of heat generated by the magnetic flux field, and the amount of heat removed by flow of the coolant fluid.

The induction coils 26 are connected to a temperature control system that includes a power supply 51, a controlling element 52, a sensor 53 and, optionally, a fluid coolant supply (not shown). The power supply 51 supplies an oscillating current, preferably at 3 KHz, to the coils 26 which causes the coils to generate the electromagnetic flux field. The fluid coolant supply supplies water to the induction coils 26 for circulation through the coils and the removal of thermal energy from the dies 11, 12. The sensor 53 is capable of measuring the power supplied by the power supply 51 in order to control the temperature of the part. Alternatively, or in addition to measuring the power supply, the sensor 53 includes a voltmeter that can measure the voltage drop across the induction coils 26. The controlling element gathers the power supply, or voltage measurements from the sensor 53 and uses the measurements in a feedback loop to adjust the power being supplied by the power supply 51. The controlling element can include hardware, software, firmware, or a combination thereof that is capable of using feedback to adjust the power supply 51.

As shown best in FIG. 3, the susceptor 34 of the present invention is a layer, or sheet, of magnetically permeable material positioned along the inside surface of the die cavity 22. The die cavity itself is shaped to roughly conform to the shape of the susceptor 34 so as to provide support for the susceptor. In the embodiment shown in FIG. 3, the upper die 11 defines a portion of the cavity 22 that has a shape with multiple contours, while the lower die 12 defines a planar shape. It should be noted that other, more or less complex, shapes can be defined by the contours of both the upper and lower die portions of the cavity 22 and the depicted embodiment should not be viewed as limiting. Preferred magnetically permeable materials for constructing the susceptor 34 include ferromagnetic materials that have an approximately 10 fold decrease in magnetic permeability when heated to a temperature higher than a critical, or Curie, temperature. Such a large drop in permeability at the critical temperature promotes temperature control of the susceptor and, as a result, temperature control of the part being manufactured. Ferromagnetic materials include the five elements Fe, Co, Ni, Gd and Dy, and alloys of those elements.

The die cavity may also be coated with a protective liner 24 for improved durability of the dies 11, 12 against wear caused by insertion and removal of the susceptors and against heat generated by the susceptors. Preferred materials for the liner include NEXTEL ($Al_2O_3$) fiber with an alumina-silicate or alumina matrix, or silicon carbide fibers in a silicon carbide matrix, a total of about 0.100 inches thick. The susceptor 34 in the embodiment depicted in FIG. 3 includes upper and lower portions that are receivable into the cavity 22 defined by the upper and lower dies 11, 12. It should be noted that the susceptor can have several portions, each contacting a respective portion of the part.

Figure 4:
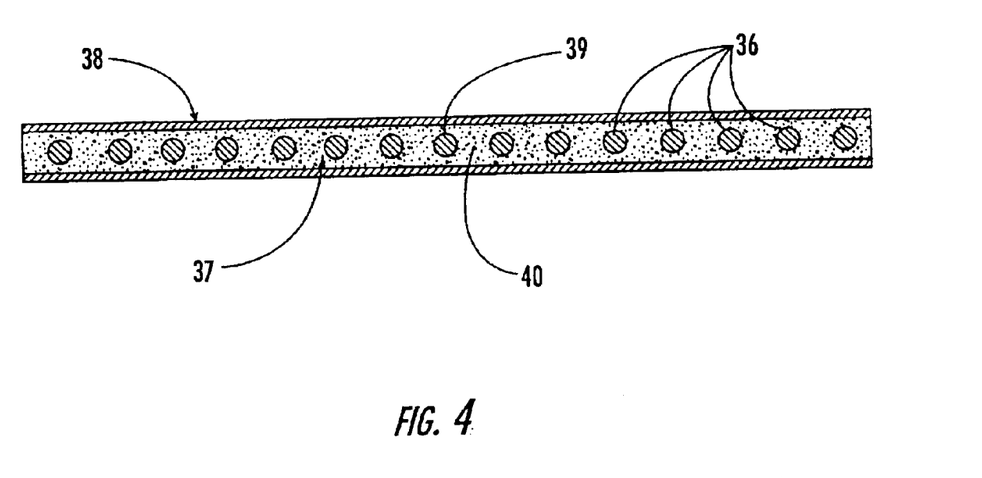
FIG. 4 is a cross-section of the thermally sprayed susceptor shown in FIG. 3.

Preferably, the susceptor 34 of the present invention is a thermally sprayed, smart susceptor that includes a mesh structure 36 supporting a magnetically permeable, thermally sprayed material 37 and optionally including a nickel aluminide coating 38, as shown in FIG. 4. The mesh structure 36 is preferably a wire mesh constructed of stainless steel, or of a metal having the same composition as the thermally sprayed material 37 that can withstand the temperature and other environmental factors associated with heating and forming of the part 60. The mesh structure 36 provides a skeleton, or support structure, that holds together the sprayed material 37. More preferably, the wire mesh structure 36 is a very flexible mesh weave that can closely drape to the shape of a model worked or machined to the contours of the desired final part geometry. In one example, the mesh structure 36 is comprised of 0.020 inch thick, 300 series stainless steel wire. Further preferably, the mesh structure 36 should have sufficiently sized interstices 40 between its wires 39 to allow interdigitation of the sprayed material 37 within the mesh structure, while at the same time providing support for the sprayed material. Preferably, the opening size of the mesh is approximately five times the wire diameter. For instance, a 0.020 inch wire would have a 0.100 inch mesh opening.

The preferred method of constructing the smart susceptor 34 includes machining, or forming, a model of the desired part geometry from richlite or aluminum. The mesh structure 36 is draped over the contours of the model and may be tacked, glued, or otherwise attached, to the surface of the model. The material 37 starts in a powder form and is heated and sprayed from a plasma spray gun onto the mesh-covered part model until the sprayed material reaches a desired thickness. The susceptor 34 is released from the model by removal of the glue or tacks and is subjected to a bright annealing and sintering operation to consolidate the wire mesh structure 36 with the thermally sprayed material 37. Preferably, the annealing and sintering is performed in a hydrogen gas furnace so as to reduce oxidation in the susceptor and to increase the density of the susceptor. As shown in FIG. 4, a nickel aluminide coating 38 is also thermally sprayed on both sides of the susceptor 34 after completion of the annealing and sintering operation.

The composition of the thermally sprayed material 37 and wire mesh structure 36 can be varied to approximately match the desired range of operation temperature(s) of the smart susceptor 34, as described in U.S. Pat. No. 5,728,309 to Matsen et al., commonly assigned, and incorporated herein by reference as above. For instance, Matsen describes some of the various alloys, and other materials, that exhibit smart susceptor characteristics and their respective Curie temperatures in column 13, Tables 1 and 2.

Figure 5A:
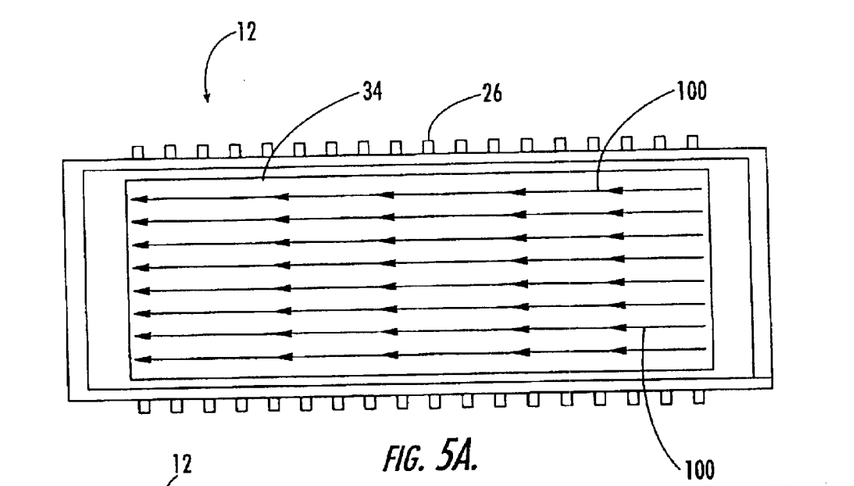
FIG. 5A is a plan view of a bottom one of the dies shown in FIG. 3 holding a bottom portion of the susceptor shown in FIG. 3.
Figure 5B:
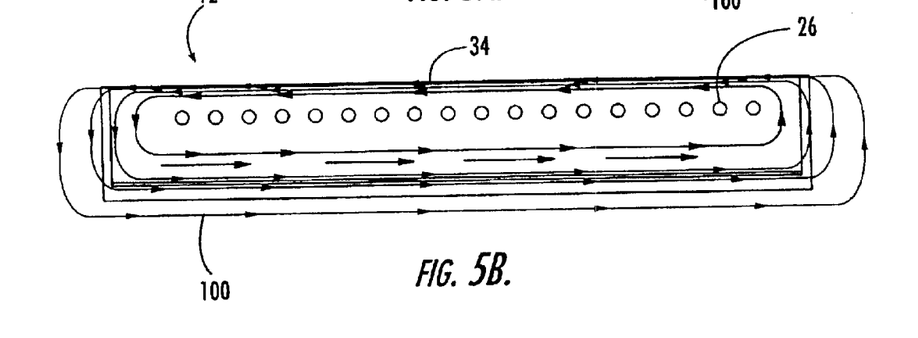
FIG. 5B is a side elevation view of the bottom die and bottom susceptor portion shown in FIG. 5A.

The process of heating and forming the part includes inserting sheets of titanium, or other metal or composite, into the cavity 22 defined by the upper and lower dies 11, 12 and between the upper and lower portions of the smart susceptor 34 supported therein, when the dies are spaced apart along the threaded column supports 15. Optionally, the dies 11, 12 may be removed from the column supports. The dies 11, 12 are then brought together by movement along the column supports 15 until the part sheets and the susceptor 34 are enclosed in the cavity 22 and the cavity is sealed. The temperature controller 50 allows the power supply 51 to supply a predetermined amount of power, as shown graphically in FIG. 8B. The power is supplied to the induction coils 26 causing an oscillating current in the coils which generates an electromagnetic flux field. As shown by FIGS. 5A and 5B, the flux field, depicted as flux lines 100, travel directly through the ceramic material 23 of the lower die 12 due to its lack of magnetic permeability and couple with the magnetically permeable material of the susceptor 34. Coupling with the magnetic flux field induces eddy currents in the susceptor, which, in turn, results in the generation of heat. The heat increases the temperature of the susceptor which, being adjacent to the titanium sheets of the part 60 and trapped therewith in the cavity 22 of thermally insulative ceramic material 23, results in a temperature increase of the part, as shown by the thermocouple readings 102 of FIG. 7. The differences in the thermocouple readings are a result of different locations of the thermocouples.

Figure 6A:
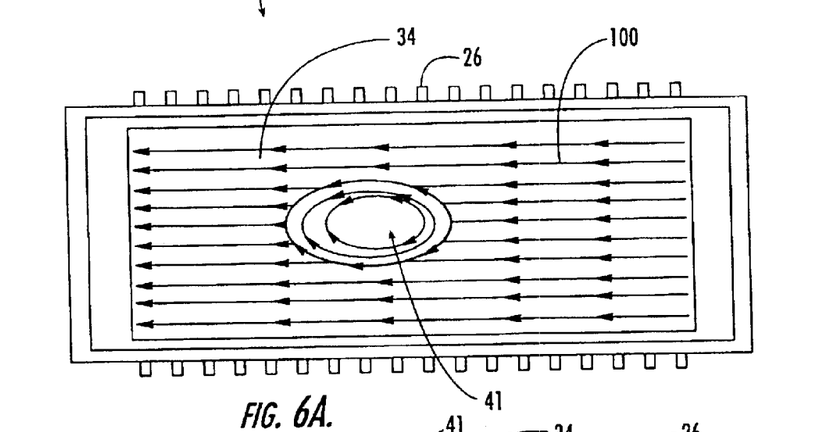
FIG. 6A is a plan view of the bottom die and bottom susceptor portion of FIG. 5A showing a region of magnetic impermeability in the susceptor.
Figure 6B:
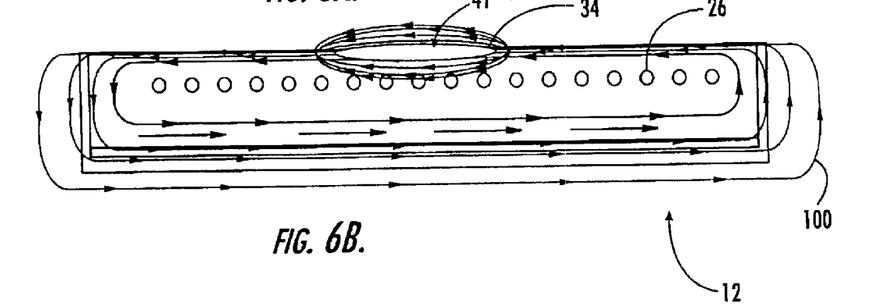
FIG. 6B is a side elevation view of the bottom die and bottom susceptor portion with the region of magnetic impermeability shown in FIG. 6A.
Figure 8A:
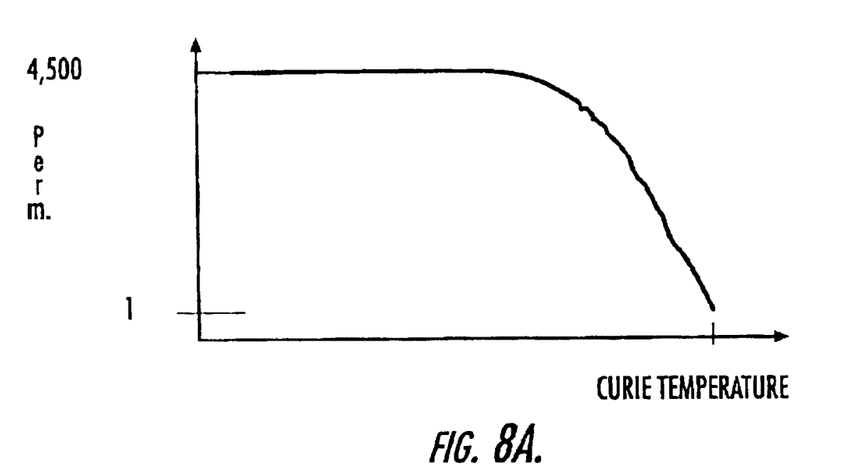
FIG. 8A is a graph showing a decrease in magnetic permeability of the smart susceptor shown in FIG. 3 as its temperature increases.

The average temperature of the part 60 increases at a roughly steady rate, with the aforementioned variances between part locations, until a portion 41, or portions, of the susceptor 34 reach the Curie temperature. The temperature of the dies 11, 12 and induction coils 26 is kept relatively low by a supply of the coolant fluid through the tubes of the induction coils. Upon reaching the Curie temperature, those portions of the susceptor experience a sudden drop in magnetic permeability, wherein the permeability approaches unity, as shown in FIG. 8A. The sudden drop in magnetic permeability results in a distortion of the magnetic flux generated by the induction coils 26 which moves out of the impermeable area of the susceptor 34, as shown by the flux lines 100 of FIGS. 6A and 6B. The remaining portions of the susceptor continue to receive flux and generate heat, and may even produce more heat due to the magnetic flux being pushed out of the portions at the Curie temperature and drawn into the remaining portions of the susceptor.

Figure 7:
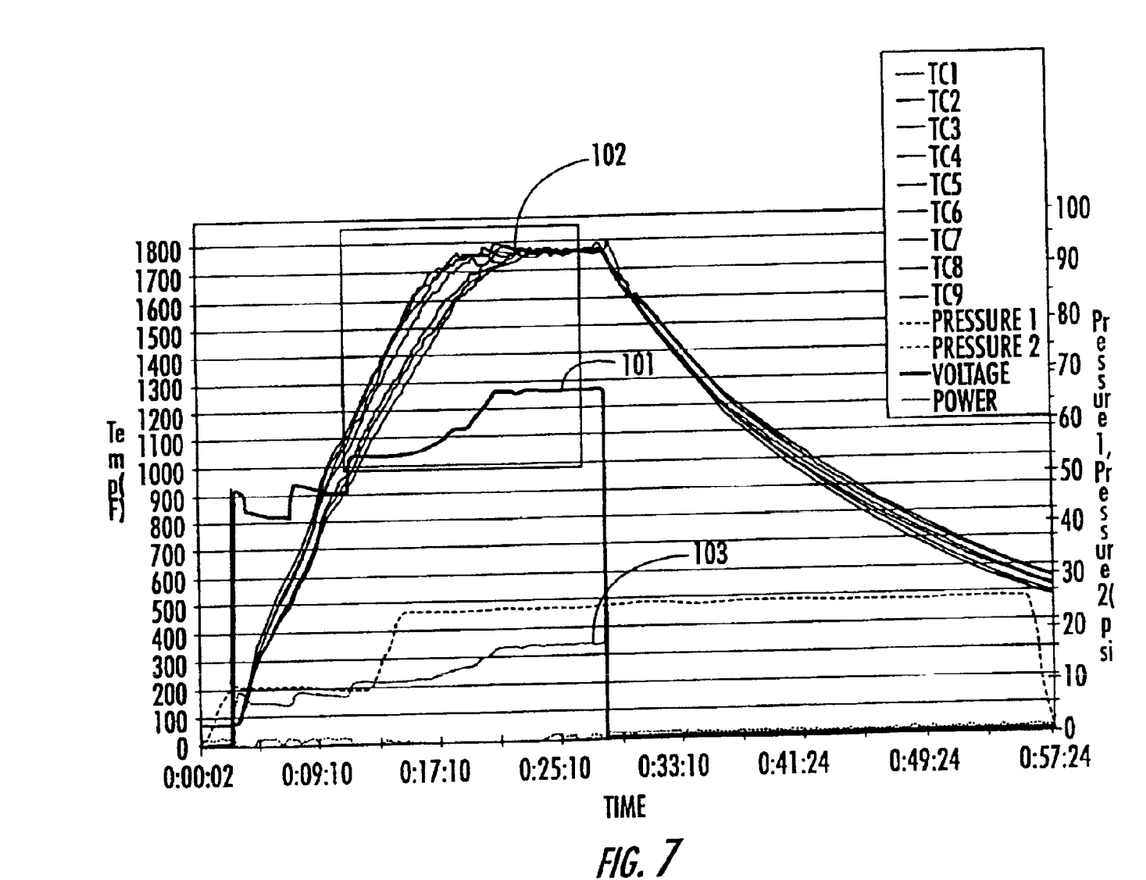
FIG. 7 is a graph showing heating and forming of a part using the temperature control system of FIG. 2.
Figure 8B:
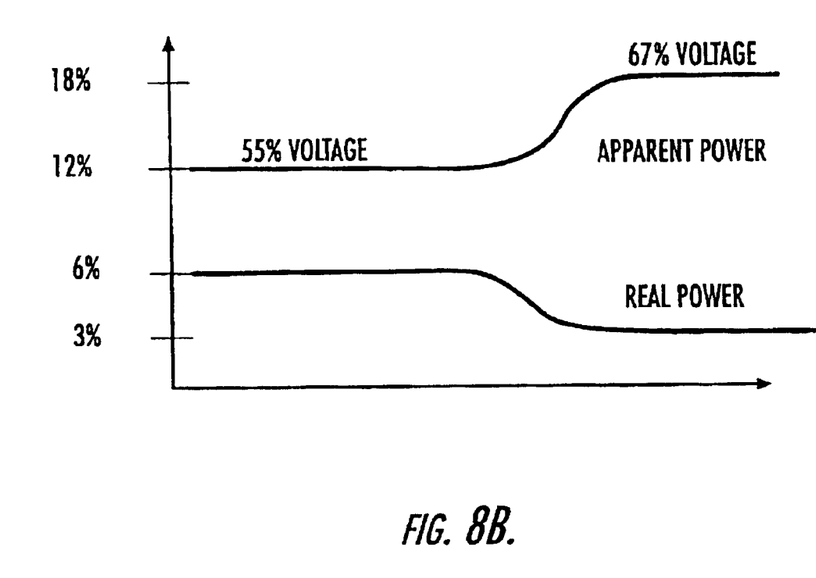
FIG. 8B is a graph showing an increase in induction coil power concomitant with the decrease in susceptor magnetic permeability shown in FIG. 8A.

Eventually, the entire susceptor 34 reaches the Curie temperature and experiences a drop in magnetic permeability. The decrease in magnetic permeability of the susceptor also coincides with a decrease in the inductance of the coil and the amount of energy absorbed by the part 60, as shown in FIG. 8B. Concomitant with the decrease in the magnetic permeability of the susceptor, the sensor 53 detects an increase in the voltage (and/or applied power) of the power supply 51. The voltage rise, therefore, can be related to the permeability drop, which, in turn, relates to the global temperature of the susceptor 34 and the part 60. This effect is illustrated in FIG. 7, which shows voltage readings 101 and power readings 103 begin to rise as the thermocouple readings 102 begin to approach the Curie temperature. The voltage readings 101 begin to flatten out once all of the thermocouples are at the Curie temperature. The controlling element 52 detects the sudden change in voltage using the sensor 53 and can, as desired, maintain, raise, or lower the voltage of the power supply 51 without the need for thermocouples, or other direct temperature sensing devices. Generally, the range of temperature control is about ±10° F. over a 20° F. window around the Curie point. Other aspects of the temperature control system are described in U.S. patent application Ser. No. 10/094,568 entitled "System and Method for Controlling an Induction Heating Process," filed Mar. 8, 2002, commonly assigned, and incorporated herein by reference.

While the susceptor 34 is at the Curie temperature, the titanium part 60 is formed due to the internal pressure supplied by inert gas, as shown by the pressure arrows 104 of FIG. 3. As described above, the smart susceptor 34 in one embodiment is a mesh screen 36 supporting a thermally sprayed material 37 that has been closely conformed to the shape of the desired part geometry. As the temperature of the susceptor 34 and part 60 increase, the pressure of the air trapped between the titanium sheets increases and forces the sheets away from each other and against the complex molding surfaces of the susceptor. Air between the dies 11, 12 and the part 60 is allowed to escape through vent holes (not shown) in the dies so as to avoid inhibiting formation of the part.

The present invention has several advantages. The use of the mesh screen 36 and thermally sprayed, magnetically permeable powder material 37 allows the smart susceptor to be molded to geometrically complex parts, overcoming the forming limitations of previously used metal sheet susceptors. In particular, the flexible weaves of mesh 36 closely drape to the geometrically complex parts while providing support for the magnetically permeable material 37 to avoid failure during handling and processing. Increased complexity of part geometry allows a reduction in the number of parts used in assemblies, with a concomitant cost and weight reduction. Hydrogen gas furnace annealing reduces oxidation in the mesh and sprayed powder material, while the increased temperature increases the density of the material.

Many modifications and other embodiments of the invention will come to mind to one skilled in the art to which this invention pertains having the benefit of the teachings presented in the foregoing descriptions and the associated drawings. For instance, the mesh weave 36 can be used to support flexible susceptor material 37 that has been deposited using other processes, such as electroplating. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An induction heating device for manufacturing a part by heating the part to a predetermined temperature, the induction heating device comprising:
   an induction coil capable of generating an electromagnetic flux field; and
   a susceptor positioned in the electromagnetic flux field, the susceptor comprising:
      a magnetically permeable material responsive to the electromagnetic flux field to generate heat; and
      a mesh structure supporting the magnetically permeable material wherein the mesh structure and magnetically permeable material conform to at least a portion of the part so as to be capable of receiving the portion of the part and heating the portion of the part as the magnetically permeable material is heated.

2. An induction heating device of claim 1, wherein the mesh structure is constructed of wire capable of withstanding the heat generated by the electromagnetic flux.

3. An induction heating device of claim 1, wherein the mesh structure is constructed of stainless steel wire.

4. An induction heating device of claim 3, wherein the stainless steel wire is 0.02 inch thick stainless steel wire.

5. An induction heating device of claim 1, wherein the mesh structure is constructed of a material having at least a 10 fold decrease in permeability when exceeding a Curie temperature.

6. An induction heating device of claim 1, wherein the magnetically permeable material and mesh structure define a cavity that conforms to all of the part.

7. An induction heating device of claim 6, wherein the mesh structure comprises at least two separable portions, the two separable portions combinable to define the cavity.

8. An induction heating device of claim 7, further comprising a die having at least two die portions and wherein each of the separable portions of the mesh structure are attached to a respective one of the die portions, wherein said die is configured to hold the separable portions of the mesh structure together so as to define the cavity.

9. An induction heating device of claim 1, further comprising an electrical power supply and wherein the induction coil is operably connected to the electrical power supply.

10. A method of manufacturing a susceptor for heating a part in response to application of a magnetic flux field, the method comprising:
    providing a model having an outer geometry approximating at least a portion of the part;
    draping a mesh screen over the part and conforming the mesh screen to the outer geometry of the model;
    depositing magnetically permeable material on the mesh screen; and
    releasing the mesh screen and magnetically permeable material from the model.

11. A method of claim 10, wherein the providing the model includes machining the model from richlite.

12. A method of claim 10, wherein the providing the model includes machining the model from aluminum.

13. A method of claim 10, wherein conforming the mesh screen includes tacking the mesh screen to the outer geometry of the model.

14. A method of claim 10, wherein conforming the mesh screen includes gluing the mesh screen to the outer geometry of the model.

15. A method of claim 10, wherein depositing magnetically permeable metal includes thermally spraying magnetically permeable metal powder on the screen.

16. A method of claim 15, wherein depositing magnetically permeable metal further includes thermally spraying a nickel aluminide powder and forming an outer coating on the screen.

17. A method of claim 10, further comprising sintering and annealing the magnetically permeable material after releasing the mesh screen.

18. A method of claim 17, wherein said sintering and annealing are performed in a hydrogen gas furnace.

19. A smart susceptor for manufacturing a part by heating the part in response to exposure to an electromagnetic flux field, the smart susceptor comprising:
    a magnetically permeable material responsive to the electromagnetic flux field to generate heat; and
    a mesh structure supporting the magnetically permeable material wherein the mesh structure and magnetically permeable material conform to at least a portion of the part so as to be capable of receiving the portion of the part and heating the portion of the part as the magnetically permeable material is heated.

20. An induction heating device of claim 19, wherein the mesh structure is constructed of wire capable of withstanding the heat generated by the electromagnetic flux.

21. An induction heating device of claim 19, wherein the mesh structure is constructed of stainless steel wire.

22. An induction heating device of claim 21, wherein the stainless steel wire is 0.02 inch thick stainless steel wire.

23. An induction heating device of claim 19, wherein the mesh structure is constructed of the magnetically permeable material.

24. An induction heating device of claim 19, wherein the magnetically permeable material includes a nickel aluminide coating.

25. An induction heating device of claim 19, wherein the magnetically permeable material and mesh structure define a cavity that conforms to all of the part.

26. An induction heating device of claim 25, wherein the mesh structure comprises at least two separable portions, the two separable portions combinable to define the cavity.

27. An induction heating device of claim 26, further comprising a die having at least two die portions and wherein each of the separable portions of the mesh structure are attached to a respective one of the die portions, wherein said die is configured to hold the separable portions of the mesh structure together so as to define the cavity.

* * * * *

UNITED STATES PATENT AND TRADEMARK OFFICE
CERTIFICATE OF CORRECTION

PATENT NO. : 6,566,635 B1
DATED : May 20, 2003
INVENTOR(S) : Matsen et al.

It is certified that error appears in the above-identified patent and that said Letters Patent is hereby corrected as shown below:

Title page, Item [54] and Column 1, line 1,
In the title, cancel "SMART".

Title page,
Item [57], ABSTRACT,
Line 5, cancel "smart".

Column 10,
Lines 37 and 39, cancel "smart".

Signed and Sealed this

Twenty-third Day of September, 2003

JAMES E. ROGAN
*Director of the United States Patent and Trademark Office*